United States Patent
Shim et al.

(10) Patent No.: US 8,279,547 B2
(45) Date of Patent: Oct. 2, 2012

(54) METHOD OF SETTING ZONE LAYOUT OF RECORDING MEDIUM, AND APPARATUS USING METHOD

(75) Inventors: Jae-chul Shim, Hwaseong-si (KR); Hae-Jung Lee, Suwon-si (KR)

(73) Assignee: Seagate Technology International, Grand Cayman, (KY)

( * ) Notice: Subject to any disclaimer, the term of this patent is extended or adjusted under 35 U.S.C. 154(b) by 267 days.

(21) Appl. No.: 12/894,248

(22) Filed: Sep. 30, 2010

(65) Prior Publication Data
US 2011/0080820 A1    Apr. 7, 2011

(30) Foreign Application Priority Data
Oct. 1, 2009  (KR) .................. 10-2009-0094052

(51) Int. Cl.
*G11B 5/09* (2006.01)
(52) U.S. Cl. ........................................................ 360/53
(58) Field of Classification Search ............ 360/31, 360/46, 48, 51, 53; 369/53.41
See application file for complete search history.

(56) References Cited

U.S. PATENT DOCUMENTS
| | | | | |
|---|---|---|---|---|
| 5,870,237 A | * | 2/1999 | Emo et al. | 360/48 |
| 6,084,732 A | * | 7/2000 | Lee | 360/53 |

FOREIGN PATENT DOCUMENTS
| | | |
|---|---|---|
| JP | 10143811 A | 5/1998 |
| JP | 2001076435 A | 3/2001 |
| JP | 2008004139 A | 1/2008 |
| KR | 100238675 B1 | 10/1999 |

* cited by examiner

*Primary Examiner* — Wayne Young
*Assistant Examiner* — Brenda Bernardi
(74) *Attorney, Agent, or Firm* — Volentine & Whitt, PLLC

(57) ABSTRACT

A data storage device determines a zone layout based on a quality evaluation factor. The zone layout is designed such that a measurement value of the quality evaluation factor for each track in each zone is within a range between a predetermined upper limit and a predetermined lower limit and a maximum amount of variation of the measurement value within each zone is substantially equal to a difference between the upper limit and the lower limit.

20 Claims, 11 Drawing Sheets

METHOD OF SETTING ZONE LAYOUT OF RECORDING MEDIUM, AND APPARATUS USING METHOD

CROSS-REFERENCE TO RELATED APPLICATIONS

This application claims priority under 35 U.S.C. §119 to Korean Patent Application No. 10-2009-0094052 filed on Oct. 1, 2009, the disclosure of which is hereby incorporated by reference in its entirety.

BACKGROUND

Embodiments of the inventive concept relate generally to data storage devices such as hard disk drives (HDDs). More particularly, embodiments of the inventive concept relate to methods of setting zones in recording media of the data storage devices.

Certain types of data storage devices, including HDDs, store data on rotating disks comprising concentric tracks. In these disks, data is accessed by positioning a read head over a selected track and rotating the disk to a part of the track containing the data.

The tracks of an HDD are generally divided into sectors each comprising a fixed number of bits (e.g., 512 bits). In many conventional HDDs, each track has the same number of sectors. Accordingly, the larger outer tracks store the same number of bits as smaller inner tracks, which results in inefficient utilization of disk space. To address this inefficiency, newer data storage devices, including some HDDs, have adopted a technique known as "zoned bit recording" in which the concentric tracks are divided into groups called "zones". Each zone comprises tracks having the same number of sectors, but number of sectors-per-track differs from zone to zone. For instance, a zone comprising a group of inner tracks can have a certain number of sectors per track, and a zone comprising a group of outer tracks can have a larger number of sectors per track. By using a larger number of sectors in the tracks of outer zones, the disks can achieve greater bit density and storage capacity in those tracks.

One issue presented by zoned bit recording is that different zone layouts can produce different numbers of bit errors. This occurs because there is generally a tradeoff between bit density and bit error rate. Accordingly, in conjunction with the development of different zone layouts, research is also being conducted on techniques for reducing bit error rate (BER) distributions in different areas of recording media.

SUMMARY

Embodiments of the inventive concept provide methods of setting a zone layout of a recording medium, and storage devices and disk drives employing the methods. In certain embodiments, the methods reduce the bit error rate of storage devices and disk drives.

According to one embodiment of the inventive concept, a method of setting a zone layout of a recording medium is provided. The method comprises determining an upper limit and a lower limit of a quality evaluation factor related to reading or writing data on the recording medium, and determining a number of zones of the recording medium and a number of tracks in each zone such that a measurement values of the quality evaluation factor in each zone fall between the upper limit and the lower limit, and a maximum variation of the measurement values of the quality evaluation factor of each zone is substantially equal to a difference between the upper limit and the lower limit.

In certain embodiments, the quality evaluation factor comprises a bit error rate or a channel statistics measurement.

In certain embodiments, the recording medium comprises a disk having an inner diameter and an outer diameter, and determining of the number of zones of the recording medium and the number of tracks in each zone comprises determining a recording density factor value for each zone such that the measurement value of the quality evaluation factor of an outermost track of each zone is substantially equal to the upper limit, calculating a measurement value of the quality evaluation factor by moving a magnetic head from an outermost track of each zone in a direction toward the inner diameter while applying a recording density factor value determined in each of the zones, and determining a track in which the calculated measurement value of the quality evaluation factor is substantially equal to the lower limit as an innermost track of a corresponding zone.

In certain embodiments, the recording density factor comprises a factor for setting a number of bits per inch.

In certain embodiments, the method further comprises identifying a track adjacent to an inner side of the innermost track of the corresponding zone as an outermost track of a next zone.

In certain embodiments, the method further comprises identifying an outermost track of a data area of the recording medium as an outermost track of an outermost zone, and starting a process for setting a zone layout from the outermost zone.

In certain embodiments, the recording medium comprises a disk having an inner diameter and an outer diameter, and determining the number of zones of the recording medium and the number of tracks in each zone comprises determining a recording density factor value for each zone such that the measurement value of the quality evaluation factor of an innermost track of each zone of the recording medium is substantially equal to the lower limit, calculating a measurement value of the quality evaluation factor by moving a magnetic head from an innermost track of each zone in a direction toward the outer diameter while applying a recording density factor value determined in each of the zones, and determining a track in which the calculated measurement value of the quality evaluation factor is substantially equal to the upper limit as an outermost track of a corresponding zone.

In certain embodiments, the method further comprises identifying a track adjacent to an outer side of the outermost track of the corresponding zone as an innermost track of a next zone.

In certain embodiments, the method further comprises identifying an innermost track of a data area of the recording medium as an innermost track of an innermost zone, and starting a process for setting a zone layout from the innermost zone.

According to another embodiment of the inventive concept, a data storage device comprises a recording medium comprising a plurality of tracks and a data storage area allocated within the plurality of tracks, a media interface configured to write and read data by accessing the recording medium, and a processor configured to calculate measurement values of a quality evaluation factor related to writing or reading performance of the data storage area by controlling the media interface, and further configured to determine a number of zones of the recording medium and a number of tracks in each of the zones such that the calculated measurement value for each zone falls between a predetermined upper limit and a predetermined lower limit of the quality evaluation factor, and a maximum variation of the measurement values of the quality evaluation factor of each zone is substantially equal to a difference between the upper limit and the lower limit.

In certain embodiments, the recording medium comprises a disk having an inner and outer diameter and the tracks are formed on the disk, and the processor determines a recording density factor value for each of the zones such that the measurement value of the quality evaluation factor of an outermost track of each zone is substantially equal to the upper limit, and the processor identifies a track in which the calculated measurement value of the quality evaluation factor is substantially equal to the lower limit as an innermost track of a corresponding zone.

In certain embodiments, the processor identifies a track adjacent to an inner side of the innermost track of the corresponding zone as an outermost track of a next zone.

In certain embodiments, the recording medium comprises a disk having an inner and outer diameter and the tracks are formed on the disk, the processor determines a recording density factor value for each of the zones such that the quality evaluation factor measurement value of an innermost track of each of the zones is substantially equal to the lower limit, and the processor identifies a track with the calculated measurement value of the quality evaluation factor substantially equal to the upper limit as an outermost track of a corresponding zone.

In certain embodiments, the processor identifies a track adjacent to an outer side of the outermost track of the corresponding zone as an innermost track of a next zone.

In certain embodiments, the recording medium comprises a hard disk drive platter.

In certain embodiments, the quality evaluation factor comprises a bit error rate or a channel statistics measurement.

According to still another embodiment of the inventive concept, a data storage device comprises a recording medium comprising a data storage area divided into a plurality of zones, a media interface configured to write and read data by accessing the recording medium, and a processor configured to control the media interface for each of the zones of the recording medium such that data is written to a target track of the recording medium and data is read from the target track of the recording medium. A number of zones of the recording medium and a number of tracks included in each of the zones are determined such that a measurement value of a quality evaluation factor of each of the zones of the recording medium falls between a predetermined upper limit and a predetermined lower limit and distributions of measurement values of the quality evaluation factor are substantially the same in each of the zones.

In certain embodiments, the processor determines a recording density factor value for each zone such that a measurement value of the quality evaluation factor for an outermost track or an innermost track of each zone of the data storage area is substantially the same as the upper limit or the lower limit, and the processor determines the outermost or innermost track of each zone by moving a magnetic head in a direction toward an inner diameter or an outer diameter of the recording medium while applying a recording density factor value for each zone and determining whether the measurement value of the quality evaluation factor of each track is substantially equal to the lower limit or the upper limit.

In certain embodiments, the quality evaluation factor comprises a bit error rate or a channel statistics measurement.

In certain embodiments, the recording medium comprises a hard disk drive platter.

BRIEF DESCRIPTION OF THE DRAWINGS

Embodiments of the inventive concept will be more clearly understood from the following detailed description taken in conjunction with the accompanying drawings. In the drawings, like reference numbers denote like features.

DETAILED DESCRIPTION OF THE EMBODIMENTS

Embodiments of the inventive concept will now be described more fully with reference to the accompanying drawings. The inventive concept may, however, be embodied in many different forms and should not be construed as being limited to the embodiments set forth herein. Rather, these embodiments are provided as teaching examples.

Figure 1:
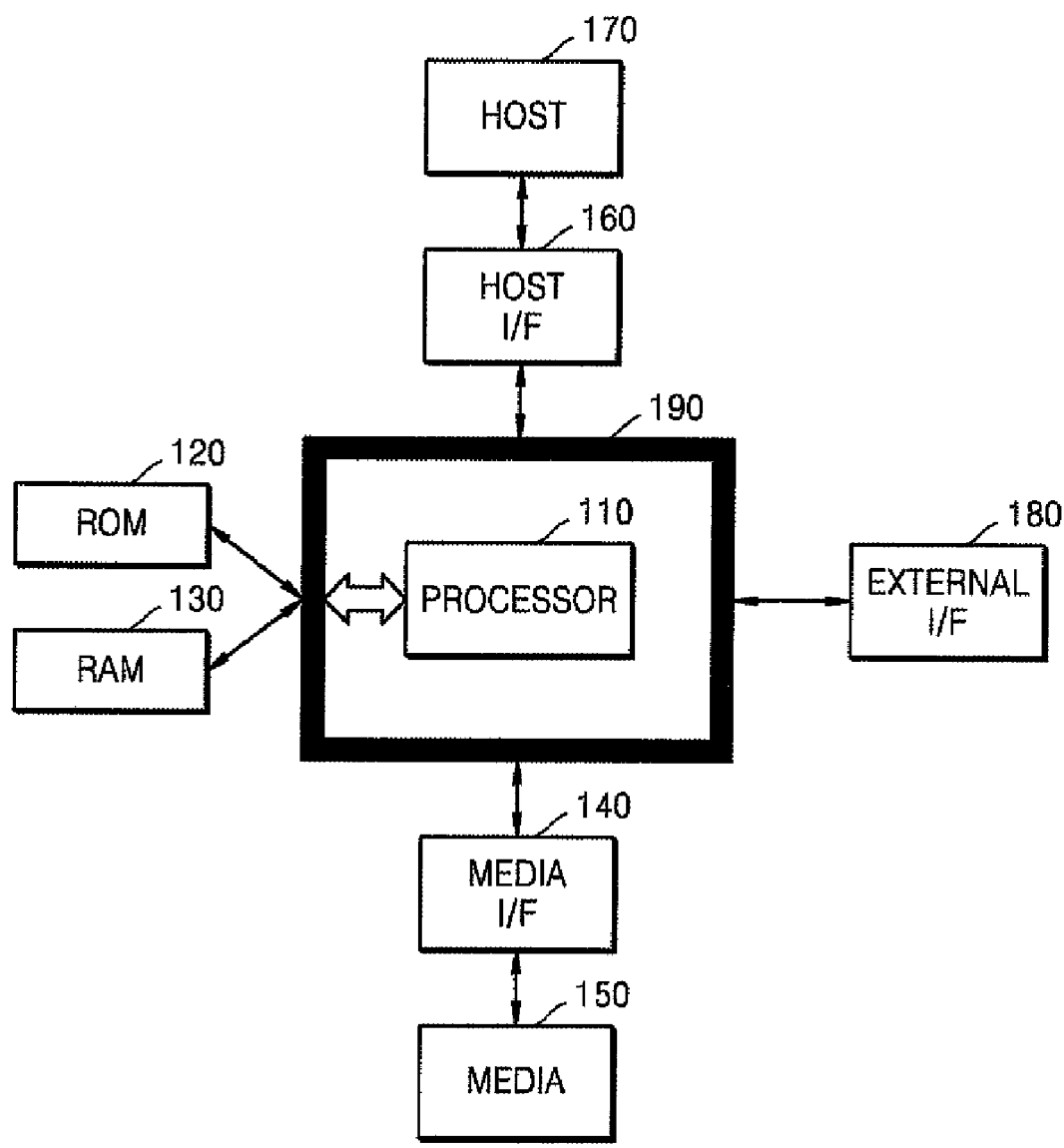
FIG. 1 is a diagram illustrating a data storage device according to an embodiment of the inventive concept.

FIG. 1 is a diagram illustrating a data storage device according to an embodiment of the inventive concept. Referring to FIG. 1, the data storage device comprises a processor 110, a read only memory (ROM) 120, a random access memory (RAM) 130, a media interface (MEDIA I/F) 140, a storage medium 150, a host interface (HOST I/F) 160, a host device 170, an external interface (EXTERNAL I/F) 180, and a bus 190.

Processor 110 interprets commands and controls other elements of the data storage device according to the commands. Processor 110 comprises a code object management unit, and loads code objects from storage medium 150 to RAM 130 using the code object management unit. In particular, processor 110 loads code objects to RAM 130 to execute methods for setting a zone layout of a recording medium, such as those illustrated in FIGS. 5 through 7. The methods for setting a zone layout are typically executed in a manufacturing process of a data storage device. For instance, in a manufacturing process for a disk drive, the methods can be executed in a burn-in test process.

Figure 5:
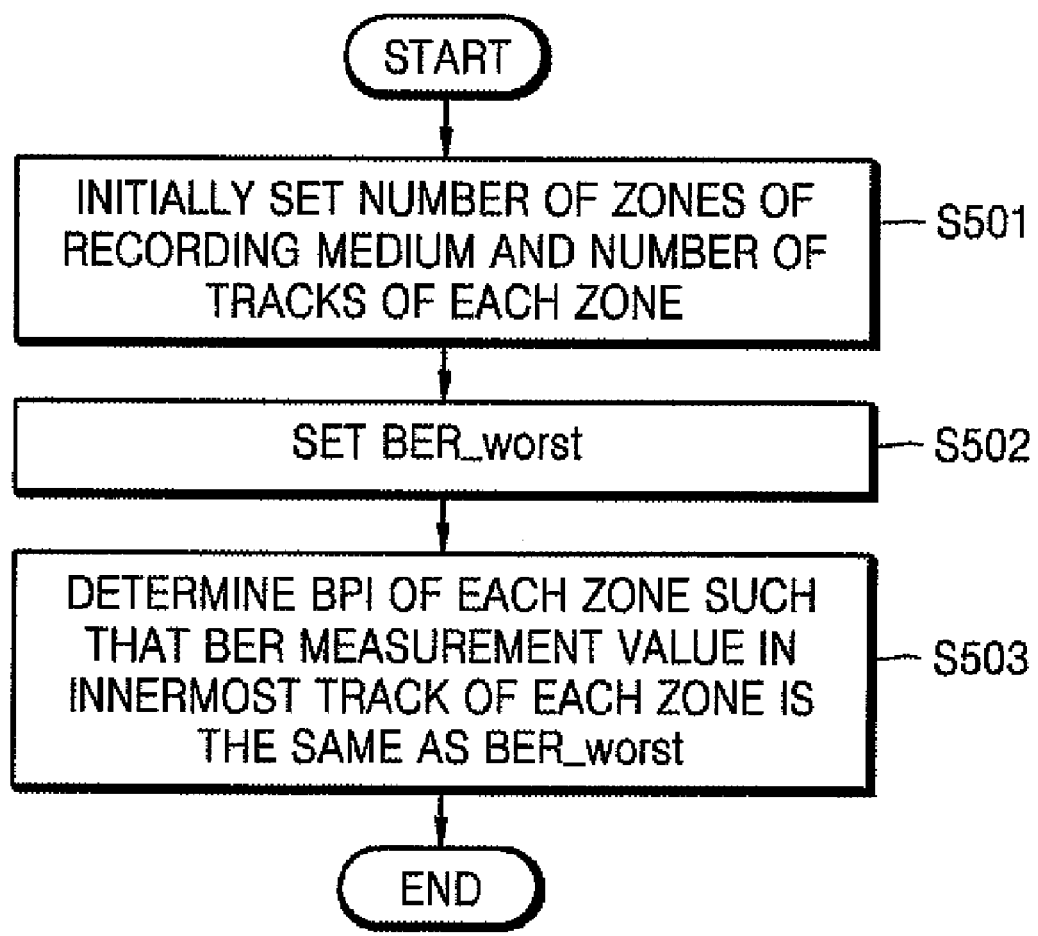
FIG. 5 is a flowchart illustrating a method of designing a zone layout of a data storage device according to an embodiment of the inventive concept.
Figure 6:
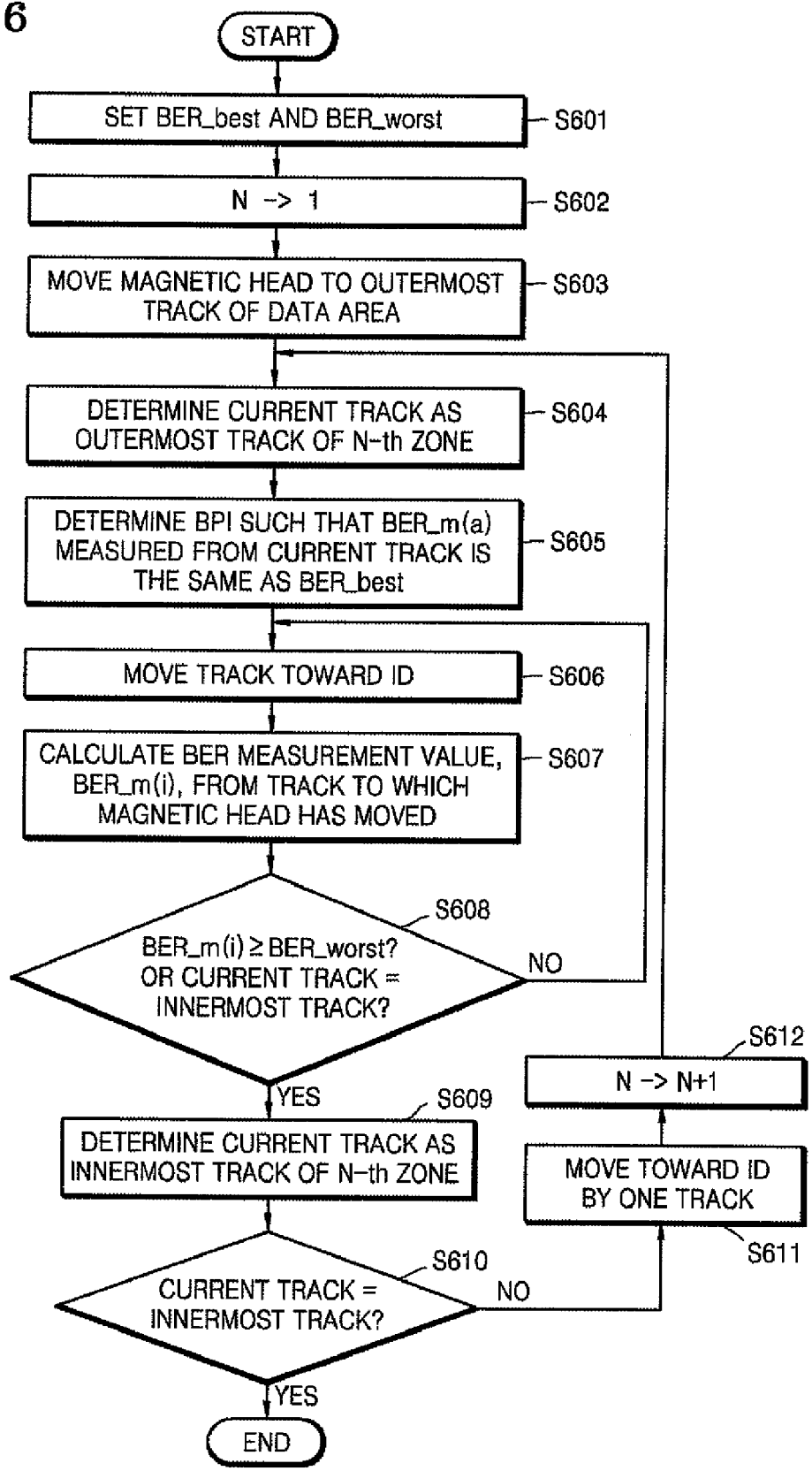
FIG. 6 is a flowchart illustrating a method of designing a zone layout of a data storage device according to another embodiment of the inventive concept.
Figure 7:
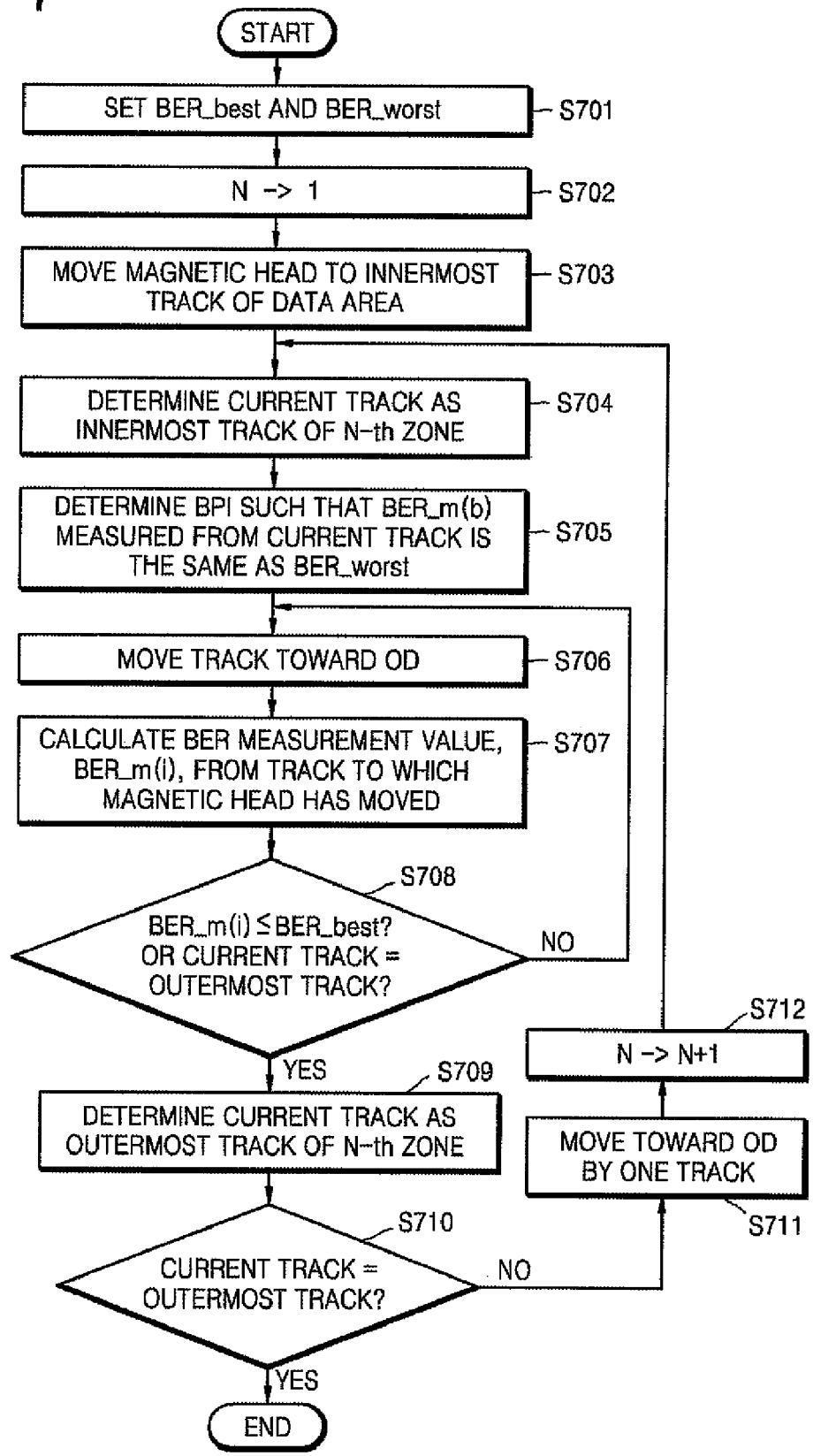
FIG. 7 is a flowchart illustrating a method of designing a zone layout of a data storage device according to still another embodiment of the inventive concept.

In the example of FIG. 1, the methods for setting a zone layout are performed on storage medium 150 according to the flowcharts of FIGS. 5 through 7 and using code objects loaded in RAM 130. After these methods are performed, processor 110 stores track information in storage medium 150 and ROM 120 to distinguish each of the zones according to the zone layout. Examples of the information used to distinguish the zones include outer circumferential track information and inner circumferential track information of each of the zones.

ROM 120 stores program code and data used to operate the data storage device. RAM 130 loads the program code and data stored in ROM 120 or storage medium 150 under the control of processor 110.

Storage medium 150 typically comprises a disk providing a main storage medium of the data storage device. The data storage device typically comprises a disk drive, and a detailed structure of a head disk assembly comprising a disk is illustrated in FIG. 2.

Figure 2:
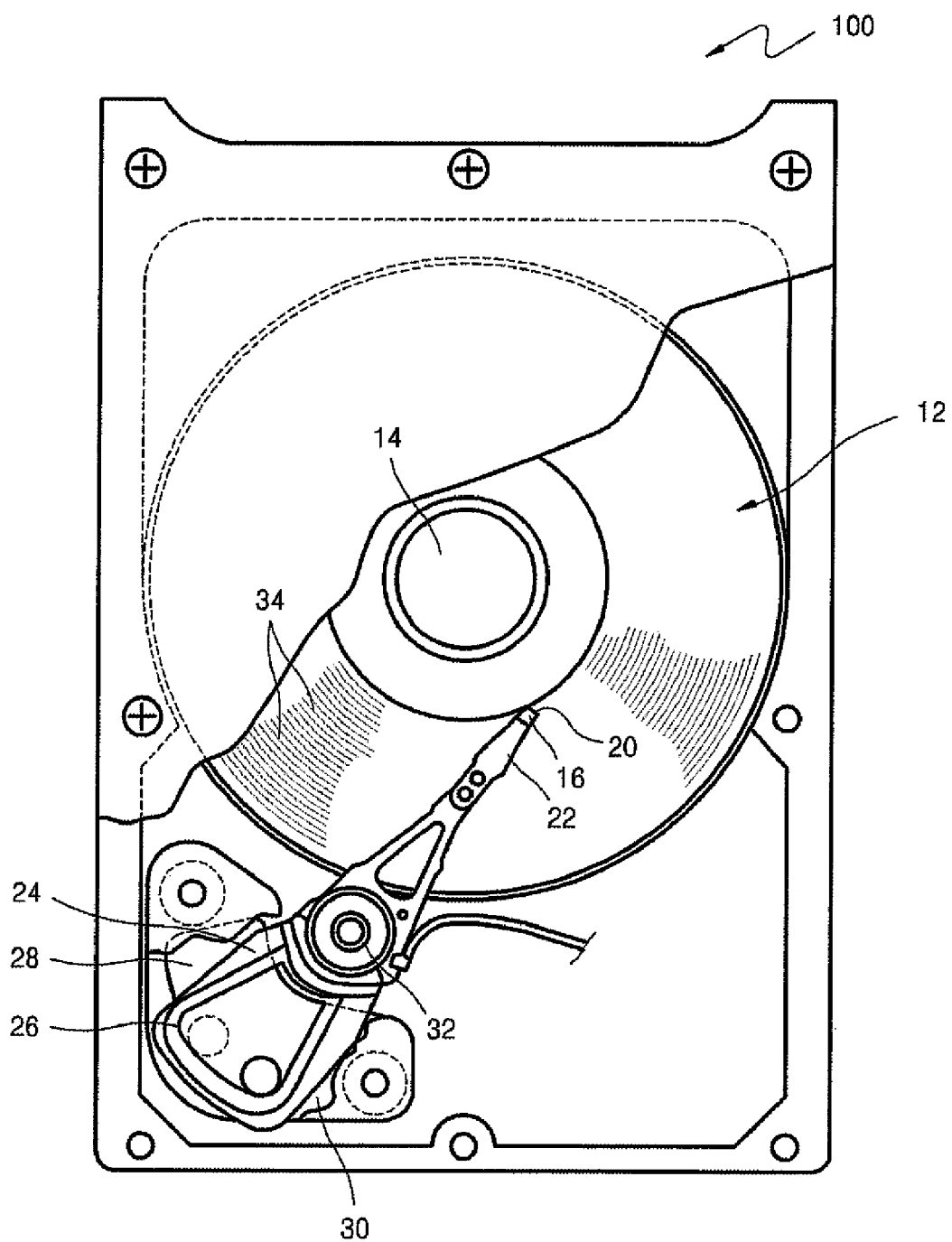
FIG. 2 is a diagram illustrating a head disk assembly of a disk drive according to an embodiment of the inventive concept.

FIG. 2 is a diagram illustrating a head disk assembly 100 of a disk drive according to an embodiment of the inventive concept. Referring to FIG. 2, head disk assembly 100 comprises at least one magnetic disk 12 that is rotated by a spindle motor 14. Head disk assembly 100 further comprises a transducer 16 located adjacent to a surface of disk 12.

Transducer 16 senses a magnetic field of disk 12 or magnetizes disk 12 to read or write information from or to disk 12 as it is rotated. Transducer 16 is coupled to a surface of disk 12. Although one transducer 16 is illustrated in FIG. 2, transducer 16 should be regarded as comprising a write transducer for magnetizing disk 12 and a read transducer for magnetizing disk 12. The read transducer comprises a magneto-resistive (MR) device. Transducer 16 is usually referred to as a magnetic head or a head.

Transducer 16 is integrated with a slider 20. Slider 20 generates an air bearing between surfaces of transducer 16 and disk 12, and is coupled to a head gimbal assembly 22. Head gimbal assembly 22 is attached to an actuator arm 24 having a voice coil 26. Voice coil 26 is disposed adjacent to a magnetic assembly 28 to define a voice coil motor (VCM) 30. A current supplied to voice coil 26 generates torque for rotating actuator arm 24 with respect to bearing assembly 32. Due to the rotation of actuator arm 24, transducer 16 is moved across the surface of disk 12.

Data is stored in a plurality of ring-shaped tracks 34 of disk 12. Where multiple disks are stacked on top of each other, corresponding tracks on different disks form cylinders. Each of tracks 34 usually comprises a plurality of sectors. Each sector comprises a data field and an identification field. The identification field comprises a sector and a gray code for identifying a track or cylinder. A logic block address is allocated in a recordable area of disk 12. The logic block address of the disk drive is converted to cylinder/head/sector information to designate a recording area of disk 12. Disk 12 is divided into a maintenance cylinder area which a user cannot access and a data area which the user can access. The maintenance cylinder area is also referred to as a system area. Transducer 16 is moved across the surface of disk 12 to read or write data of other tracks.

A plurality of code objects for implementing various functions in the disk drive can be stored in disk 12. For example, a code object for performing a MP3 player function, a code object for executing a navigation function, or a code object for performing various video games can be stored in disk 12.

Referring again to FIG. 1, processor 110 accesses storage medium 150 via media interface 140 to write or read data. Media interface 140 in the data storage device implemented as a disk drive comprises a servo circuit controlling the head disk assembly and a read/write channel circuit performing signal processing for reading/writing data.

Host interface 160 performs data transmission/reception to/from host device 170 such as a personal computer, and may be an interface having one of several standards, such as a serial advanced technology attachment (SATA) interface, a parallel advanced technology attachment (PATA) interface, or a universal serial bus (USB) interface.

External interface 180 performs data transmission/reception to/from an external device via an input/output terminal installed in the data storage device. Examples of external interface 80 include an accelerated graphics port (AGP) interface, a USB interface, a IEEE1394 interface, a personal computer memory card international association (PCMCIA) interface, a local area network (LAN) interface, a Bluetooth interface, a high definition multimedia interface (HDMI), a programmable communication interface (PCI), an industry standard architecture (ISA) interface, a peripheral component interconnect-express (PCI-E) interface, an express card interface, a SATA interface, a PATA interface, and a serial interface.

Bus 190 transfers data between the elements of the data storage device.

Figure 3:
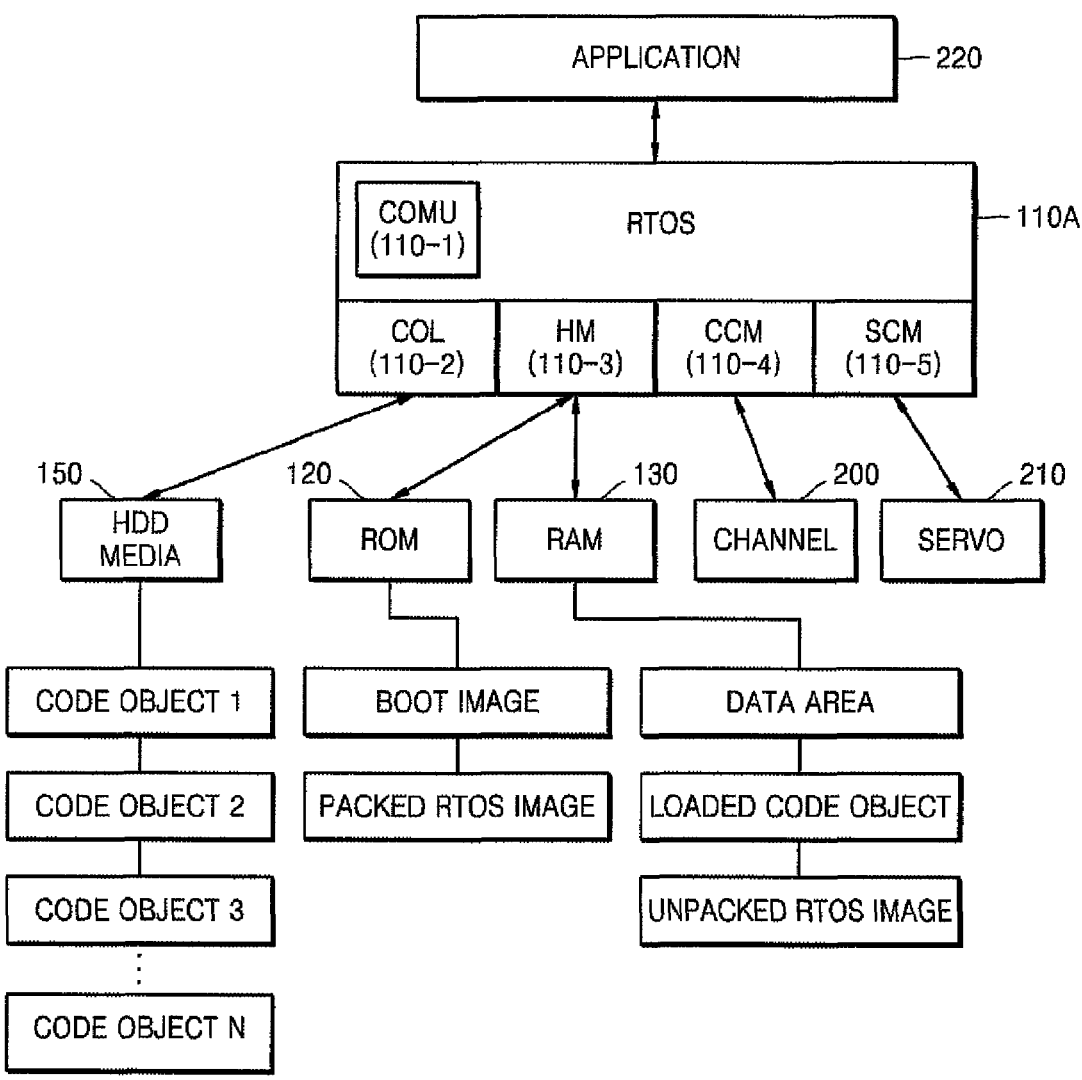
FIG. 3 is a diagram illustrating an operating system of the data storage device of FIG. 1.

FIG. 3 illustrates an operating system the data storage device of FIG. 1. In the example of FIG. 3, it is assumed that the data storage device of FIG. 1 is a hard disk drive (HDD).

In the embodiment of FIG. 3, ROM 120 stores a boot image and packed real time operating system (RTOS) image.

Storage medium 150 of the HDD stores a plurality of code objects 1-N. The code objects comprise code used to operate the disk drive and code related to various functions that can be extended to the disk drive. The code objects also comprise code for executing the method of setting a zone layout of a recording medium according to methods illustrated in FIGS. 5 through 7. The code objects for executing the methods of FIGS. 5 through 7 can be stored in ROM 120 instead of storage medium 150 of the HDD. ROM 120 or storage medium 150 can also store code objects for performing functions such as a MP3 player functions, navigation functions, video game functions, and others.

An unpacked RTOS image obtained by reading a boot image from ROM 120 is loaded to RAM 130. In addition, code objects used by a host interface and an external interface stored are loaded from storage medium 150 to RAM 130. An area DATA AREA for storing data is also allocated in RAM 130.

Circuits that are used to perform signal processing for data reading/writing are mounted in a channel circuit 200, and circuits used for controlling a head disk assembly for performing data reading/writing are mounted in servo circuit 210.

RTOS 110A is a multiple program operating system using a disk. Depending on tasks, real-time multi-processing is performed at a high priority foreground, and batch-processing is performed at a low priority background. Then, loading of code object to the disk and unloading of the code objects to the disk are performed.

RTOS 110A controls a code object management unit (COMU) 110-1, a code object loader (COL) 110-2, a memory handler (MH) 110-3, a channel control module (CCM) 110-4, and a servo control module (SCM) 110-5 to execute tasks according to received commands. Also, RTOS 110A manages application programs 220.

RTOS 110A loads code objects used for controlling the disk drive to RAM 130 when booting the disk drive. Accordingly, after the booting is executed, the disk drive may be operated by using code objects loaded to RAM 130.

COMU 110-1 stores position information about where code objects are written, converts virtual addresses into actual addresses, and performs bus arbitration. Also, information regarding priorities of tasks being executed is stored in COMU 110-1. Also, COMU 110-1 controls task control block (TCB) information and stack information used for executing tasks regarding code objects.

COL 110-2 loads the code objects stored in storage medium 150 of the HDD to RAM 130 by using COMU 110-1 or unloads the code objects stored in RAM 130 to storage medium 150 of the HDD. Accordingly, in a zone layout set mode of a recording medium, COL 110-2 loads code objects from storage medium 150 to RAM 130 for executing the methods of setting a zone layout of storage medium 150 according to the methods of FIGS. 5 through 7. Thus, RTOS 110A executes the methods of setting a zone layout of storage medium 150 according to the methods of FIGS. 5 through 7, which will be described below, by using the code objects loaded in RAM 130.

MH 110-3 performs writing or reading data to/from ROM 120 and RAM 130.

CCM 110-4 performs channel controlling to perform signal processing for data reading/writing, and SCM 110-5 controls a servo system comprising the head disk assembly for performing data reading/writing.

Figure 4:
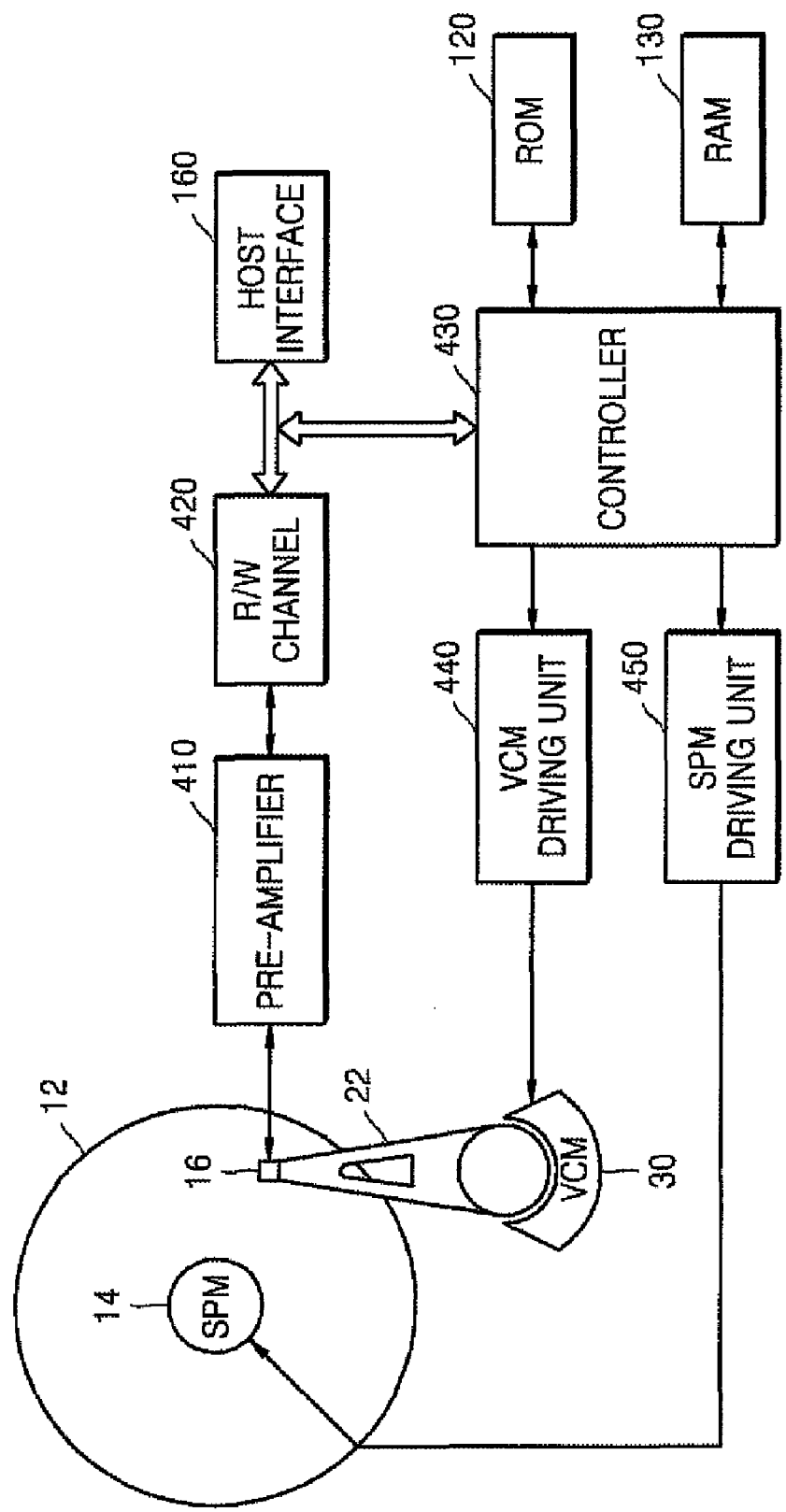
FIG. 4 is a diagram illustrating a disk drive according to another embodiment of the inventive concept.

FIG. 4 is a diagram illustrating a disk drive according to another embodiment of the inventive concept. The disk drive of FIG. 4 is an example of the data storage device of FIG. 1.

In the embodiment of FIG. 4, the disk drive comprises a pre-amplifier 410, a read/write (R/W) channel 420, a controller 430, a voice coil motor (VCM) driving unit 440, a spindle motor (SPM) driving unit 450, ROM 120, RAM 130, and host interface 160.

Controller 430 can comprise a digital signal processor (DSP), a microprocessor, a microcontroller, a processor, or any of several controller components. Controller 430 controls R/W channel 420 to read data from disk 12 or to write data to disk 12 via host interface circuit 160 according to a command received from host device 170.

Controller 430 is coupled to VCM driving unit 440 that supplies a driving current for driving a VCM 30. Controller 430 supplies a control signal to VCM driving unit 440 to control movement of magnetic head 16.

Controller 430 is coupled to SPM driving unit 450 that supplies a driving current for driving SPM 14. When power is supplied, controller 430 supplies a control signal to SPM driving unit 450 to rotate SPM 14 at a target speed.

Controller 430 is coupled to ROM 120 and RAM 130. In this embodiment, ROM 120 stores firmware and control data for controlling the disk drive, and ROM 120 also stores program codes and data for executing the methods of FIGS. 5 through 7. However, the program codes and data for executing the methods of FIGS. 5 through 7 may also be stored in a maintenance cylinder area of disk 12 rather than in ROM 120.

In a data read mode, the disk drive amplifies an electric signal that is sensed by magnetic head 16 from disk 12 in pre-amplifier 410. Then, R/W channel 420 amplifies the electrical signal output from pre-amplifier 410 by using an automatic gain control circuit (not shown) that automatically varies a gain according to an amplitude of the electrical signal, converts the electrical signal into a digital signal, and then decodes the digital signal to detect data. For example, an error correction process can be performed on the detected data by controller 430 by using a Reed Solomon code, and then the detected data can be converted into stream data and transmitted to host device 170 via host interface circuit 160. Controller 430 calculates a BER, which can be a quality evaluation factor or an evaluation result corresponding to a channel statistical measurement (CSM) when decoding the data or performing the error correction process on the data.

Next, in a write mode, the disk drive receives data from host device 170 via host interface circuit 160, and controller 430 adds an error correction parity symbol using a Reed Solomon code, and R/W channel 420 encodes the data to be suitable for a writing channel, and then the data is written to disk 12 via magnetic head 16 using a write current that is amplified by pre-amplifier 410.

Controller 430 loads program codes and data for executing the methods of setting a zone layout of a recording medium stored in ROM 120 or disk 12 to RAM 130, and controls the elements of the disk drive to execute the methods of FIGS. 5 through 7 using the program codes and data loaded to RAM 130.

Where data is written and read using the same channel parameters regardless of track positions in disk 12, a recording bit length is smaller in an inner track of disk 12 than in an outer track of disk 12. Accordingly, recording and reproducing quality is likely to degrade in the inner track compared with the outer track of disk 12. In particular, BER characteristics and CSM characteristics of the inner track tend to be poorer than those of the outer track.

To reduce the difference in characteristics between the inner track and the outer track of disk 12, a data storage area of disk 12 is divided into a predetermined number of zones, and channel parameters are individually set for each of the zones. Where the data storage area of disk 12 is divided into a plurality of zones with different channel characteristics, there is a difference in the BER characteristics and the CSM characteristics between the inner track and the outer track within each of the zones.

Figure 8:
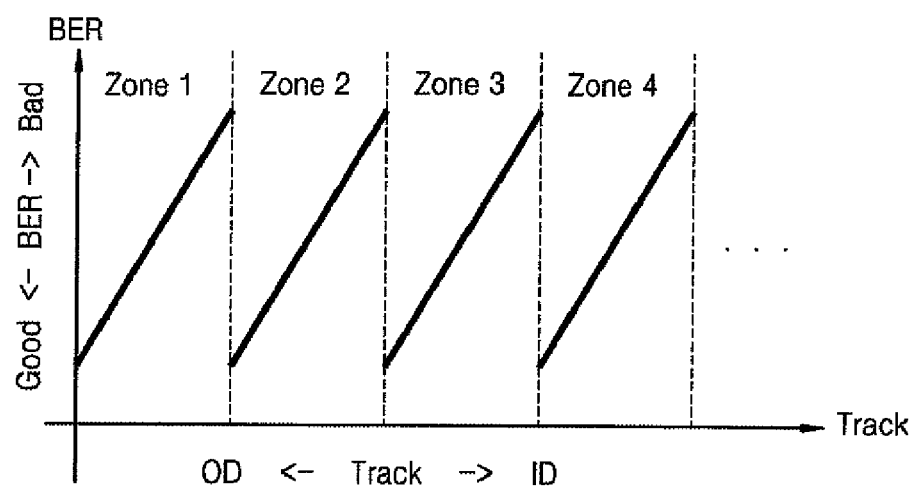
FIG. 8 is a graph illustrating bit error rates (BER) of different zones of a recording medium according to an embodiment of the inventive concept.

FIG. 8 is a graph illustrating BERs of different zones of a recording medium according to an embodiment of the inventive concept. In FIG. 8, the zones are illustrated with respect to an outer diameter (OD) and an inner diameter (ID) of a storage medium such as a disk. The BERs and reproduction characteristics, such as channel parameter characteristics, of the zones differ from track to track because recording bit lengths vary from track to track. Ideally BERs and reproduction characteristics are the same in each of the zones.

Figure 9:
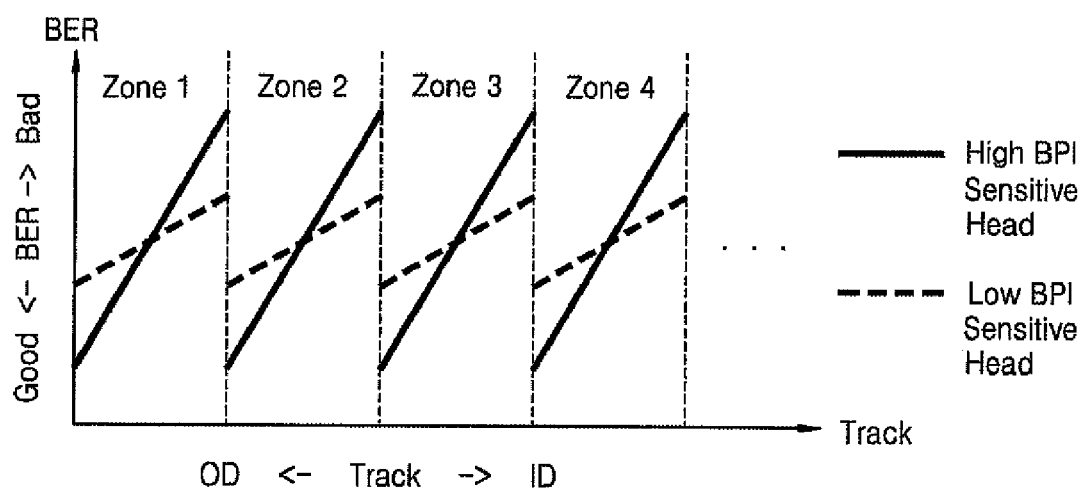
FIG. 9 is a graph illustrating BER distributions of different zones of a recording medium using different types of magnetic heads according to an embodiment of the inventive concept.

FIG. 9 illustrates BER distributions in disk 12 according to characteristics of magnetic head 16. In FIG. 9, a solid line illustrates an example of applying a magnetic head having a high bits per inch (BPI) sensitivity, and a dotted line illustrates an example of applying a magnetic head having a low BPI sensitivity.

In actual disk drives, there is a difference in the characteristics of magnetic head 16, and there is also a difference in the characteristics of disk 12 and a difference in the channel parameter characteristics between zones.

Figure 10:
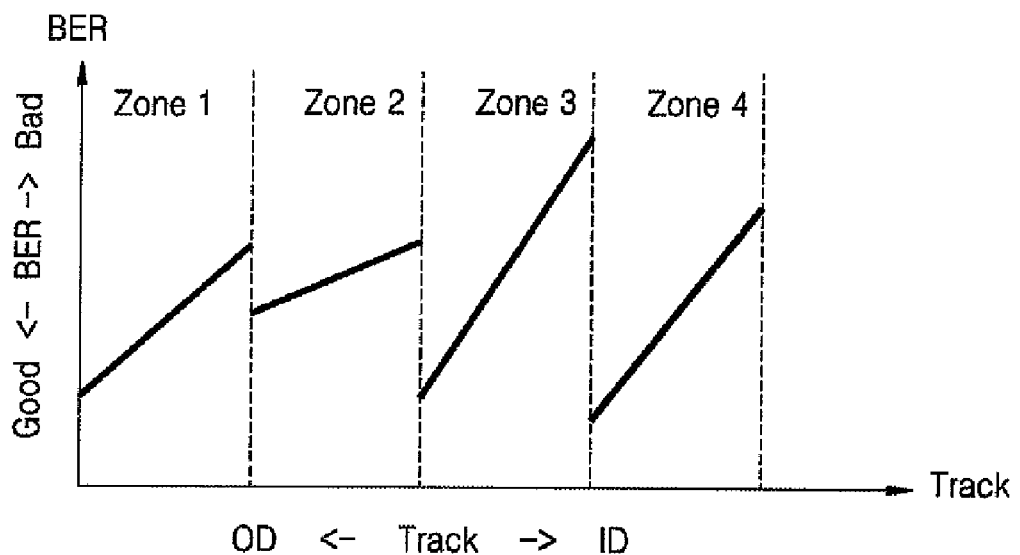
FIG. 10 is a graph illustrating BER distributions of different zones of a recording medium based on different channel parameter characteristics according to an embodiment of the inventive concept.

FIG. 10 is a graph illustrating BER distributions of different zones of disk 12 based on different channel parameter characteristics. As indicated by FIG. 10, different zones have different BER distributions. In other words, zones in actual disks tend to differ from the theoretical zone characteristics illustrated in FIGS. 8 and 9.

Hereinafter, a method of designing a zone layout for reducing BER distributions in the zones according will be described with reference to FIG. 5.

In the method of FIG. 5, a zone layout is designed such that all zones have one BER, either a best BER (a minimum BER), a worst BER (a maximum BER), or an average BER. In this method, a zone layout is designed without regard to differences in BER distributions of different zones that are caused by differences in magnetic head characteristics or channel parameter characteristics.

FIG. 5 is a flowchart illustrating a method of designing a zone layout of a data storage device according to an embodiment of the inventive concept. In the method of FIG. 5, a zone layout is designed such that all zones have a worst BER (maximum BER).

First, in an operation S501, a number of zones of a recording medium and a number of tracks for each zone are set. For instance, where the recording medium is a disk drive, the number of zones and the number of tracks in each zone are set to be the same without considering differences in BER distributions between the zones due to differences in magnetic head characteristics or channel parameter characteristics.

Next, in operation S502, a BER_worst value, which is a target worst BER of a data storage device, is set. Here, the BER_worst value means a value of a lowest quality BER that is allowed in the data storage device and is set when designing a disk drive.

Next, in an operation S503, a BPI for each zone is determined such that a BER measurement value in an innermost track set in operation S501 is the same as the BER_worst value. In other words, by measuring a BER value of the innermost track of each zone while varying a BPI for each zone, the BPI for each zone is determined such that a BER value measured in the innermost track of each zone is the same as the BER_worst value.

Figure 11:
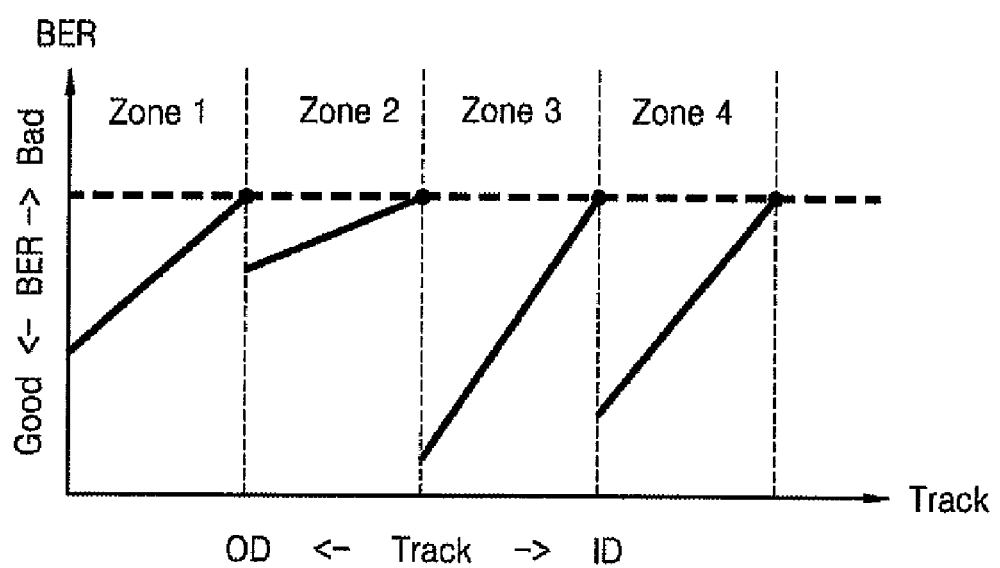
FIG. 11 is a graph illustrating BER distributions of different zones of a recording medium in a data storage device comprising a single head, wherein the zones are formed according to the method of FIG. 5.
Figure 12:
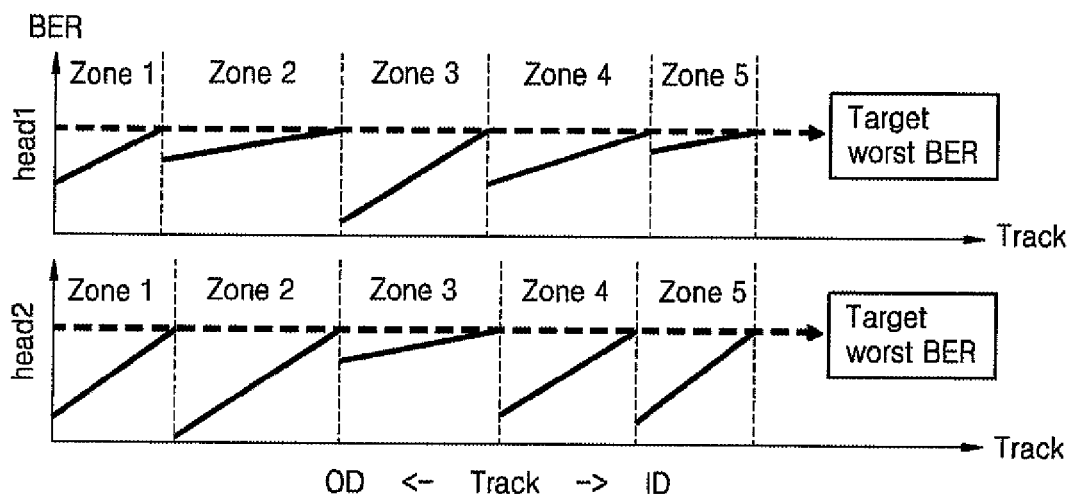
FIG. 12 is a graph illustrating BER distributions of different zones of a recording medium in a data storage device comprising a plurality of heads, wherein the zones are formed according to the method of FIG. 5.

FIG. 11 illustrates BER distributions according to zones designed by the method of FIG. 5 in a disk drive comprising a single head. FIG. 12 illustrates BER distributions according to zones designed by the method of FIG. 5 in a disk drive comprising a plurality of heads.

The differences between BER distributions of different zones are reduced in FIG. 11 compared with FIG. 10.

In the method of FIG. 5, it is assumed that the number tracks is the same in each of the zones and thus differences between the BER distributions due to differences in magnetic head characteristics and channel parameter characteristics are not considered. In addition, it is assumed that the number of zones is the same in each disk drive.

In some embodiments, the method of FIG. 5 is modified so that different data storage devices have different numbers of zones and variable numbers of tracks per zone based on writing or reproducing characteristics of the data storage devices.

FIGS. 6 and 7 illustrate a method of designing a zone layout of a data storage device according to another embodiment of the inventive concept. In the method of FIGS. 6 and 7, a zone layout is designed such that a best BER (minimum BER) and a worst BER (maximum BER) are the same in all zones of the data storage device.

Referring to FIG. 6, in an operation S601, a BER_best value, which is a target best BER, and a BER_worst value, which is a target worst BER, of a data storage device are initialized. Here, the BER_best value is a value of a best BER that is allowed in the data storage device, and a BER_worst value means a value of a worst BER allowed in the data storage device, and they are set according to design standards when designing a data storage device.

Next, in an operation S602, a value "N" of a counter (not shown) in processor 110 or controller 430 is initialized to 1. Then, in an operation S603, magnetic head 16 is moved to an outermost track of the data area of disk 12.

In an operation S604, a current track of magnetic head 16 is set as an outermost track of an N-th zone.

Next, in operation S605, a BER is measured in the current track being followed by magnetic head 16, and a BPI is determined such that a BER_m(a), which is the BER measured from the current track, and the BER_best value are the same. That is, if the measured BER_m(a) is greater than the BER best value, a BPI is reduced, and if the measured BER_m(a) is less than the BER best value, the BPI is increased in order to find a BPI at which the measured BER_m(a) and the BER best value are the same and set the found BPI as a BPI of a corresponding zone. The BPI is a factor for determining a recording density, and may also be replaced with a recording frequency factor. According to circumstances, the BPI may be determined with respect to each of the zones such that the measured BER_m(a) is included in a predetermined permissible error range of the BER best value.

In an operation S606, the track is moved in a direction toward the inner diameter. In other words, magnetic head 16 is moved to the track toward the inner circumferential direction from the current track being followed by magnetic head 16. Magnetic head 16 can be moved by one track or a plurality of tracks.

In an operation S607, a BER_m(i) value is calculated. The BER_m(i) value is a BER measurement value measured from a track to which the magnetic head has moved.

Next, in operation S608, it is determined whether the BER_m(i) value is greater than or equal to the BER_worst value by comparing the BER_m(i) value and the BER_worst value, or whether the current track being followed by magnetic head 16 is the innermost track of the data area of disk 12.

Where the BER_m(i) value is less than the BER_worst value according to the comparison in operation S608, and the current track being followed by magnetic head 16 is not the innermost track of the data area of disk 12, the method returns to operation S606.

Where the BER_m(i) value is greater than or equal to the BER_worst value according to the comparison in operation S608, or the current track being followed by magnetic head 16 is the innermost track of the data area of disk 12, the current track being followed by magnetic head 16 is determined as an innermost track of an N-th zone in operation S609.

Next, in an operation S610, the current track being followed by magnetic head 16 and the innermost track of the data area of disk 12 are compared, and if the current track being followed by magnetic head 16 is not the innermost track of the data area of disk 12, the track being followed by magnetic head 16 is moved to a next track toward the inner diameter (ID) in operation S611.

In an operation S612, "N" is incremented and the method then returns to operation S604.

Where the current track being followed by magnetic head 16 is the innermost track of the data area of disk 12 according to the comparison performed in operation S610, it means that the setting of a zone layout from the outermost track to the innermost track of the data area of disk 12 is completed, and thus the method of setting a zone layout is ended.

Processor 110 or controller 430 stores the BPI of each zone and track information of the outermost track of each zone, and track information of the innermost track of each zone as determined above in disk 12, which is storage medium 150, or in ROM 120.

FIG. 7 is a flowchart illustrating a method of designing a zone layout of a data storage device according to still another embodiment of the inventive concept.

In operation S701, a BER_best value, which is a target best BER, and a BER_worst value, which is a target worst BER, of a data storage device are set. Here, the BER_best value is a value of a best BER that is allowed in the data storage device, and a BER_worst value means a value of a worst BER allowed in the data storage device, and they are set according to design standards when designing a data storage device.

Next, in an operation S702, a counter value "N" (not shown) in processor 110 or controller 430 is set to 1. Then in an operation S703, magnetic head 16 is moved to an innermost track of a data area of disk 12.

In an operation S704, a current track to which magnetic head 16 has moved is set as an innermost track of an N-th zone.

Next, in an operation S705, a BER is measured in the current track being followed by magnetic head 16, and a BPI is determined such that the measured BER_m(b) and the BER worst value are the same. Where the measured BER_m(b) is greater than the BER worst value, the BPI is reduced, and where the measured BER_m(b) is less than the BER worst value, the BPI is increased in order to find a BPI at which the measured BER_m(b) and the BER worst value are the same and set the BPI as the BPI of a corresponding zone. According to circumstances, the BPI can be determined with respect to each of the zones such that the measured BER_m(b) is included in a predetermined permissible error range of the BER best value.

In an operation S706, the track is moved in a direction toward an outer diameter. In other words, magnetic head 16 is moved to the track toward the outer circumferential direction from the current track being followed by magnetic head 16. Magnetic head 16 may be moved by one track or a plurality of tracks.

Thereafter, in an operation S707, a BER_m(i) value is calculated. This value is a BER measurement value measured from the track to which the magnetic head has moved.

Next, in an operation S708, it is determined whether the BER_m(i) value is less than or equal to the BER_best value by comparing the BER_m(i) value and the BER_best value, or whether the current track being followed by magnetic head 16 is the outermost track of the data area of disk 12.

Where the BER_m(i) value is greater than the BER_best value according to the comparison performed in operation S708, and the current track being followed by magnetic head 16 is not the outermost track of the data area of disk 12, the method proceeds to operation S706.

Where the BER_m(i) value is less than or equal to the BER_best value according to the comparison performed in operation S708, and the current track being followed by magnetic head 16 is the outermost track of the data area of disk 12, the current track being followed by magnetic head 16 is determined as an outermost track of an N-th zone in operation S709.

Next, in operation S710, the current track being followed by magnetic head 16 and the outermost track of the data area of disk 12 are compared, and where the current track being followed by magnetic head 16 is not the outermost track of the data area of disk 12, the track being followed by magnetic head 16 is moved to a next track toward the outer diameter in operation S711.

In operation S712, "N" is incremented after performing operation S711, and then the method returns to operation S704.

Where the current track being followed by magnetic head 16 is the outermost track of the data area of disk 12 according to the comparison performed in operation S710, it means that the setting of a zone layout from the innermost track to the outermost track of the data area of disk 12 is completed, and thus the method of setting a zone layout is ended.

Processor 110 or controller 430 stores the BPI of each zone and track information of the outermost track of each zone, and track information of the innermost track of each zone as determined above in disk 12, which is storage medium 150, or in ROM 120.

Figure 13:
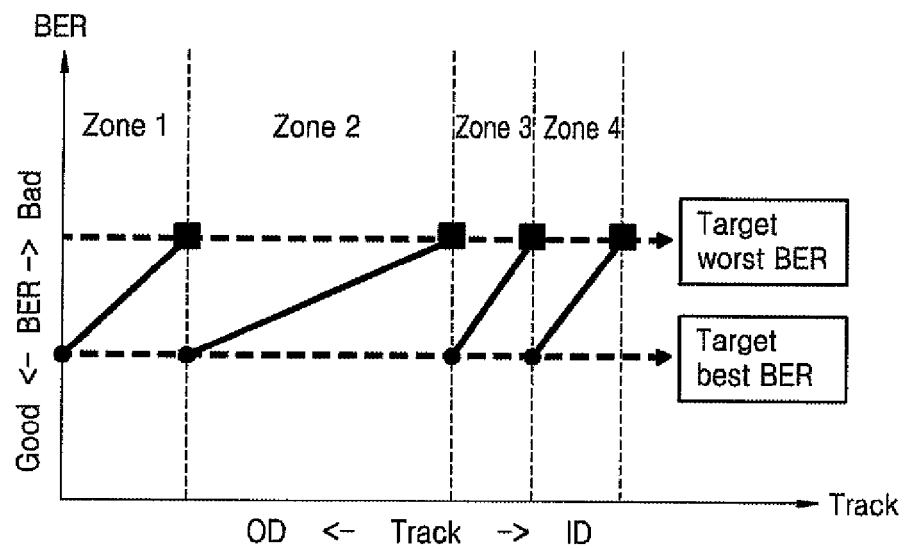
FIG. 13 is a graph illustrating BER distributions of different zones of a recording medium in a data storage device comprising a single head, wherein the zones are formed according to the method of FIG. 6 or FIG. 7.

FIG. 13 illustrates BER distributions according to zones of a disk drive comprising a single head, to which the method of designing a zone layout as illustrated in FIG. 6 or 7 is applied.

For reference, in the method of designing a zone layout as illustrated in FIG. 6, a zone layout is set while moving magnetic head 16 from the outermost track to the innermost track. Thus, referring to FIG. 13, a size of a zone is determined by measuring a BER of a ● track to a ■ track of each zone.

However, compared to this, in the method of FIG. 7, a zone layout is set while moving magnetic head 16 from the innermost track to the outermost track. Thus, in the example of FIG. 13, a size of a zone is determined by measuring a BER from a ■ track to a ● track of each zone.

Referring to FIG. 13, regardless of whether the method of FIG. 6 or the method of FIG. 7 is applied, the best BER and the worst BER of all zones are substantially the same. That is, BER deviation in all zones is uniform.

Referring to FIGS. 11 and 13, BER distributions according to zones are reduced when the method of designing a zone layout of FIG. 6 or FIG. 7 is applied compared to when the method of designing a zone layout of FIG. 5 is applied.

Figure 14:
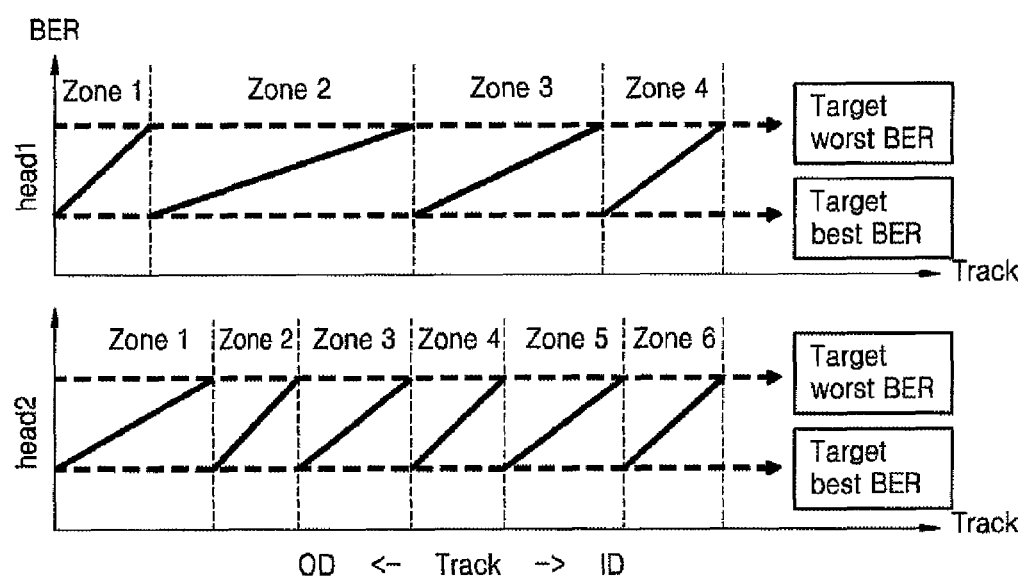
FIG. 14 is a graph illustrating BER distributions of different zones of a recording medium in a data storage device comprising a plurality of heads, wherein the zones are formed according to the method of FIG. 6 or FIG. 7.

FIG. 14 is a graph illustrating BER distributions of different zones of a recording medium in a data storage device comprising a plurality of heads, wherein the zones are formed according to the method of FIG. 6 or FIG. 7. Referring to FIG. 14, where a zone layout is determined for a disk drive having two magnetic heads—a head 1 and a head 2—using the method of FIG. 6 or FIG. 7, BER deviation in all zones is uniform regardless of the magnetic heads. Also, as shown in FIG. 14, head 1 has four zones, and head 2 has six zones. That is, the number of zones and the number of tracks of each zone can vary within the same disk drive.

On the other hand, where a zone layout is determined in a disk drive comprising a plurality of magnetic heads, by using the method of FIG. 5, the number of zones of all of the heads, head 1 and head 2, are the same as shown in FIG. 12.

Referring to FIGS. 12 and 14, BER distributions are reduced through the methods of FIG. 6 or 7 compared with the method of FIG. 5.

According to the embodiments of the inventive concept illustrated in FIGS. 5 through 7, a BER is used as a quality evaluation factor related to writing or reproduction of a data storage device but a CSM may also be used. In addition, embodiments of the inventive concept are not limited to these quality evaluation factors and other various quality evaluation factors representing performance of magnetic heads besides the BER or the CSM may also be used as quality evaluation factors related to recording or reproduction of a storage device.

The inventive concept can be embodied in many different forms, including without limitation a method, a device, and a system. Where the method is executed as software, elements of the inventive concept are code segments executing operations that are necessarily required. Programs or code segments may be stored in a processor readable medium.

While the inventive concept has been described with reference to certain embodiments thereof, the described embodiments should be considered in a descriptive sense only, and not for purposes of limitation. It will be understood by those skilled in the art that various changes in form and details may be therein without departing from the scope of the inventive concept as defined by the appended claims. Therefore, the scope of the inventive concept is defined not by the detailed description of the inventive concept but by the appended claims, and all differences within the scope will be construed as being included in the inventive concept.

What is claimed is:

1. A method of setting a zone layout of a recording medium, comprising:
    determining an upper limit and a lower limit of a quality evaluation factor related to reading or writing data on the recording medium; and
    determining a number of zones of the recording medium and a number of tracks in each zone such that a measurement values of the quality evaluation factor in each zone fall between the upper limit and the lower limit, and a maximum variation of the measurement values of the quality evaluation factor of each zone is substantially equal to a difference between the upper limit and the lower limit.

2. The method of claim 1, wherein the quality evaluation factor comprises a bit error rate (BER) or a channel statistics measurement (CSM).

3. The method of claim 1, wherein the recording medium comprises a disk having an inner diameter and an outer diameter, and wherein determining of the number of zones of the recording medium and the number of tracks in each zone comprises:
    determining a recording density factor value for each zone such that the measurement value of the quality evaluation factor of an outermost track of each zone is substantially equal to the upper limit;
    calculating a measurement value of the quality evaluation factor by moving a magnetic head from an outermost track of each zone in a direction toward the inner diameter while applying a recording density factor value determined in each of the zones; and
    determining a track in which the calculated measurement value of the quality evaluation factor is substantially equal to the lower limit as an innermost track of a corresponding zone.

4. The method of claim 3, wherein the recording density factor comprises a factor for setting a number of bits per inch (BPI).

5. The method of claim 3, further comprising:
    identifying a track adjacent to an inner side of the innermost track of the corresponding zone as an outermost track of a next zone.

6. The method of claim 3, further comprising:
    identifying an outermost track of a data area of the recording medium as an outermost track of an outermost zone, and starting a process for setting a zone layout from the outermost zone.

7. The method of claim 1, wherein the recording medium comprises a disk having an inner diameter and an outer diameter, and wherein determining the number of zones of the recording medium and the number of tracks in each zone comprises:
    determining a recording density factor value for each zone such that the measurement value of the quality evaluation factor of an innermost track of each zone of the recording medium is substantially equal to the lower limit;
    calculating a measurement value of the quality evaluation factor by moving a magnetic head from an innermost track of each zone in a direction toward the outer diameter while applying a recording density factor value determined in each of the zones; and
    determining a track in which the calculated measurement value of the quality evaluation factor is substantially equal to the upper limit as an outermost track of a corresponding zone.

8. The method of claim 7, further comprising:
    identifying a track adjacent to an outer side of the outermost track of the corresponding zone as an innermost track of a next zone.

9. The method of claim 7, further comprising:
    identifying an innermost track of a data area of the recording medium as an innermost track of an innermost zone, and starting a process for setting a zone layout from the innermost zone.

10. A data storage device, comprising:
    a recording medium comprising a plurality of tracks and a data storage area allocated within the plurality of tracks;
    a media interface configured to write and read data by accessing the recording medium; and
    a processor configured to calculate measurement values of a quality evaluation factor related to writing or reading performance of the data storage area by controlling the media interface, and further configured to determine a number of zones of the recording medium and a number of tracks in each of the zones such that the calculated measurement value for each zone falls between a predetermined upper limit and a predetermined lower limit of the quality evaluation factor, and a maximum variation of the measurement values of the quality evaluation factor of each zone is substantially equal to a difference between the upper limit and the lower limit.

11. The data storage device of claim 10, wherein the recording medium comprises a disk having an inner and outer diameter and the tracks are formed on the disk;
    wherein the processor determines a recording density factor value for each of the zones such that the measurement value of the quality evaluation factor of an outermost track of each zone is substantially equal to the upper limit; and
    wherein the processor identifies a track in which the calculated measurement value of the quality evaluation factor is substantially equal to the lower limit as an innermost track of a corresponding zone.

12. The data storage device of claim 11, wherein the processor identifies a track adjacent to an inner side of the innermost track of the corresponding zone as an outermost track of a next zone.

13. The data storage device of claim 10, wherein the recording medium comprises a disk having an inner and outer diameter and the tracks are formed on the disk;
   wherein the processor determines a recording density factor value for each of the zones such that the quality evaluation factor measurement value of an innermost track of each of the zones is substantially equal to the lower limit; and
   wherein the processor identifies a track with the calculated measurement value of the quality evaluation factor substantially equal to the upper limit as an outermost track of a corresponding zone.

14. The data storage device of claim 13, wherein the processor identifies a track adjacent to an outer side of the outermost track of the corresponding zone as an innermost track of a next zone.

15. The data storage device of claim 10, wherein the recording medium comprises a hard disk drive platter.

16. The data storage device of claim 10, wherein the quality evaluation factor comprises a bit error rate (BER) or a channel statistics measurement (CSM).

17. A data storage device comprising:
   a recording medium comprising a data storage area divided into a plurality of zones;
   a media interface configured to write and read data by accessing the recording medium; and
   a processor configured to control the media interface for each of the zones of the recording medium such that data is written to a target track of the recording medium and data is read from the target track of the recording medium,
   wherein a number of zones of the recording medium and a number of tracks included in each of the zones are determined such that a measurement value of a quality evaluation factor of each of the zones of the recording medium falls between a predetermined upper limit and a predetermined lower limit and distributions of measurement values of the quality evaluation factor are substantially the same in each of the zones.

18. The data storage device of claim 17, wherein the processor determines a recording density factor value for each zone such that a measurement value of the quality evaluation factor for an outermost track or an innermost track of each zone of the data storage area is substantially the same as the upper limit or the lower limit; and
   wherein the processor determines the outermost or innermost track of each zone by moving a magnetic head in a direction toward an inner diameter or an outer diameter of the recording medium while applying a recording density factor value for each zone and determining whether the measurement value of the quality evaluation factor of each track is substantially equal to the lower limit or the upper limit.

19. The data storage device of claim 17, wherein the quality evaluation factor comprises a bit error rate (BER) or a channel statistics measurement (CSM).

20. The data storage device of claim 17, wherein the recording medium comprises a hard disk drive platter.

* * * * *